United States Patent [19]

Wagner

[11] Patent Number: 5,618,336
[45] Date of Patent: Apr. 8, 1997

[54] EXTERNAL RELEASE AGENT

[75] Inventor: Herbert Wagner, Bad Schönborn, Germany

[73] Assignee: Rhein Chemie Rheinau GmbH, Mannheim, Germany

[21] Appl. No.: 527,486

[22] Filed: Sep. 13, 1995

Related U.S. Application Data

[63] Continuation-in-part of Ser. No. 353,624, Dec. 12, 1994, abandoned.

[30] Foreign Application Priority Data

Dec. 22, 1993 [DE] Germany .......................... 43 43 818.0

[51] Int. Cl.$^6$ ................ C09K 3/00; B28B 7/36
[52] U.S. Cl. ............. 106/2; 106/38.22; 106/38.24; 106/38.25; 106/38.7; 106/38.8; 106/475; 106/476; 106/477
[58] Field of Search .............. 106/38.22, 38.25, 106/475, 476, 2, 38.24, 38.7, 38.8, 477

[56] References Cited

U.S. PATENT DOCUMENTS 4,110,119  8/1978  Boehmke et al. ............. 106/38.24

FOREIGN PATENT DOCUMENTS 517155  9/1992  European Pat. Off. .
2332319  7/1977  France .

OTHER PUBLICATIONS

Derwent Database, JP 4–036390, (Feb. 6, 1992).

*Primary Examiner*—Anthony Green
*Attorney, Agent, or Firm*—Connolly & Hutz

[57] ABSTRACT

An external release agent is disclosed which contains:

I. Light Pigments:

10 to 60 parts by weight of amorphous silica gel powder, optionally containing up to approximately 65% by weight of water of crystallization and having an average particle diameter of around 3 to 50 μm;

0 or 0.1 to 1.5 parts by weight of pyrogenic silica with an average particle diameter of around 12 nm;

0 or 0.2 to 2.0 parts by weight of polypropylene wax.

II. Colored Pigments:

0.5 to 5.0 parts by weight of pigment-quality carbon black.

III. Binders 0.3 to 3 parts by weight of fatty acid methyl tauride, Na salt;

or 0.5 to 6.0 parts by weight of an aqueous polyethylene dispersion.

IV. Carrier Liquid:

45 to 66 parts by weight of water;

0 to 5 parts by weight of isopropanol;

0 to 5 parts by weight of foam inhibitor;

0.05 to 0.1 parts by weight of thickener;

0.01 to 0.1 parts by weight of biocide.

1 Claim, No Drawings

EXTERNAL RELEASE AGENT

This is a continuation-in-part of Ser. No. 353,624, filed Dec. 12, 1994, abandoned.

In the moulding and vulcanization of pneumatic tires, for example for motor vehicles, a solution which forms a film after drying is spread over the surface of the green tires to prevent the tires from adhering to the vulcanization mold. Both external and internal release agents are used for pneumatic tires; external release agents are applied to the outside of the green tires, internal release agents to the inside. Two different release agents are needed because the outside of pneumatic tires and the inside consist of chemically different materials.

The present invention relates to a water-based external release agent. It is primarily intended for the production of pneumatic tires for motor vehicles, although it may also be used in the production of other rubber articles (particularly those which consist of rubbers similar to the outside of pneumatic tires). Many vulcanizates produced in this manner, preferably those which contain silicate instead of carbon black, show improved electrical conductivity or reduced electrostatic charge.

Water-based external release agents are known in principle. Thus, European patent application 517 155 describes a water-based external release agent, for example for the production of pneumatic tires, which contains 5 to 35% by weight of diatomaceous earth (or certain other silicas)
0.5 to 6% by weight of pyrogenic hydrophobic silica
0.1 to 2% by weight of nonionic surfactant
0.2 to 3% by weight of certain binders, i.e. either synthetic polymers containing carboxyl groups (or salts or esters thereof) or certain natural substances, namely casein, albumin or cellulose
0.1 to 3% by weight of dye
0 to 5% by weight of ethyl alcohol and
45 to 90% by weight of water.

Accordingly, this water-based external release agent is, in principle, a dispersion of various silicas in water which is stabilized by a surfactant and which contains as its synthetic binder a water-soluble carboxy-functional polymer which is obviously capable of film formation.

The combination of silica+pyrogenic silica+carboxyfunctional polymer would appear to be the key feature of EPA 517 155.

According to the disclosure of European patent application 517 155, the proposed external release agent is ecologically safe and is sufficiently effective even in very small quantities.

Despite all these advantages, the external release agent in question is attended by the disadvantage that it gives rise to discoloration in the demolded pneumatic tires (or other moldings). This is particularly troublesome in high-quality motor vehicle tires, of which the production is the main application of external release agents. Even if it is possible to spray the green tires completely uniformly with the release agent before vulcanization and to produce a completely uniformly wetted vulcanizate, discolorations occur where projecting parts, for example sprues, have to be subsequently removed.

The external release agent according to the invention avoids these disadvantages. It contains I. Light Pigments:

| | |
|---|---|
| 10 to 60 parts by weight, preferably 15 to 30 parts by weight | of amorphous silica gel powder optionally containing up to approximately 65% by weight of water of crystallization and having an average particle diameter of around 3 to 50 μm |
| 0 or 0.1 to 1.5 parts by weight | of pyrogenic silica with an average particle diameter of around 12 nm |
| 0 or 0.2 to 2.0 parts by weight | of polypropylene wax (preferably micronized; average particle diameter 10 to 20 μm) |

II Colored pigments:

| | |
|---|---|
| 0.5 to 5.0 parts by weight | of pigment-quality carbon black |

III Binders:

| | |
|---|---|
| 0.3 to 3 parts by weight or | of fatty acid methyl tauride, Na salt |
| 0.5 to 6.0 parts by weight, preferably 1.0 to 3.0 parts by weight | of an aqueous polyethylene dispersion |

IV Carrier liquid:

| | |
|---|---|
| 45 to 66 parts by weight | of water |
| 0 to 5 parts by weight | of isopropanol |
| 0 to 5 parts by weight | of foam inhibitor |
| 0.05 to 0.1 parts by weight | of thickener |
| 0.01 to 0.1 parts by weight | of biocide. |

Accordingly, the main difference between the external release agent according to the invention and the external release agent according to European patent application 517 155 lies in the replacement of the carboxyfunctional polymer by fatty acid methyl tauride salt and/or a polyethylene and/or polypropylene wax in combination with the use of certain silica gels and pigments.

Known water-based external release agents which contain diatomaceous earth or other water-free silicas (precipitated or pyrogenic) and carbon black as fillers have the disadvantage that the vulcanized tires become grey and patchy when they are unevenly sprayed or oversprayed with the external release agent.

By using the formulation containing amorphous silica gel powder (containing around 65% of water of crystallization), the grey discoloration is avoided with no adverse effect on vulcanization.

The production of the external release agent and its application follow the rules laid down in European patent application 517 155. Specific reference is made to the teaching of this document in order to avoid repetitions.

Nevertheless, a brief description of the production process for the external release agent and its application is given in the following:

EXAMPLE 1

Ingredients:

| | |
|---|---|
| 62 parts by weight | water |
| 0.05 part by weight | Kelzan D (polysaccharide thickener) |
| 0.23 part by weight | Rewopal LA 6, a nonionic surfactant |
| 0.06 part by weight | Foammaster 306 (fatty acid polyglycol ether) |
| 0.13 part by weight | Soy bean lecithin (Sojalecithin W 250) |
| 1.00 part by weight | polypropylene powder (Lanco Wax PP 1362) |
| 4.00 part by weight | fatty acid methyl tauride, Na salt, 30% (Hostapon CT-paste) |
| 23.0 parts by weight | silica gel powder 65% $H_2O$ cryst. (Daraclar 920) |
| 0.50 part by weight | Aerosil 200 (silica, pyrogenic) |
| 2.00 parts by weight | Pigmosol schwarz 0058 (carbon black) |
| 3.00 parts by weight | Bayferrox 318 M (iron oxide) |

| Ingredients: | |
|---|---|
| 4.00 parts by weight | isopropyl alcohol |
| 0.03 part by weight | Proxel GXL (biocide) |

Production of the External Release Agent

1. Start with half the quantity of water.
2. Add Rewopal LA 6, Sojalecithin W 250, Foammaster 306 and Kelzan D and stir for 5 minutes.
3. Add Hostapon CT paste. Stir until the paste has blended in (approx. 15 minutes).
4. Add Lanco Wax PP 1362 D. Stir until the powder has blended in (approx. 10 minutes).
5. Add Daraclar 920, Aerosil 200, Pigmosol 0058, Bayferrox 318 M and ¼ of the quantity of water and stir for 10 minutes.
6. Add ¼ of the quantity of water (remainder), isopropanol and Proxel GXL and stir for 5 minutes.

A sprayable aqueous emulsion is obtained. The outsides of green tires are sprayed with this emulsion before vulcanization. The vulcanized tires show no discoloration.

EXAMPLE 2

| Ingredients: | |
|---|---|
| 62.25 parts by weight | of water |
| 0.08 parts by weight | of a thickener (Keizan D, a polysaccharide) |
| 4.00 parts by weight | of Hostapon CT-paste (30% aqueous solution of Na-fatty acid methyl tauride, manufactured by Hoechst AG) |
| 0.15 parts by weight | Etingal (a biopolymer manufactured by DMF AG) |
| 27.00 parts by weight | Daraclar 920 (amorphous silica gel powder, manufactured by Grace) |
| 0.75 parts by weight | Aerosil 200 (Pyrogenic silica) |
| 1.25 parts by weight | Printex V (carbon black) |
| 4.25 parts by weight | Permaid DI (30% by weight aqueous polyethylene dispersion, manufactured by Hoechst AG) |
| 0.02 parts by weight | Proxel GXL |

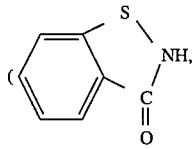

biocide, manufactured by ICI)

Process of Manufacture

Place ½ of the water in a vessel, add Kelzan D and stir for 5 minutes, add Hostapon CT-paste and stir until the paste is distributed, add ½ of the Etingal, add ¼ of the water, add Daraclar 920, Aerosil 200 and Printex V (10 minutes stirring) add ¼ of the water, Proxel GXL, ½ of the Etingal and stir until the mixture is homogeneous.

I claim:

1. An external release agent comprising:

I. Light Pigments:

10 to 60 parts by weight of amorphous silica gel powder, optionally containing up to approximately 65% by weight of water of crystallization and having an average particle diameter of around 3 to 50 μm;

optionally, from 0.1 to 1.5 parts by weight of pyrogenic silica with an average particle diameter of around 12 nm;

optionally, from 0.2 to 2.0 parts by weight of polypropylene wax

II. Colored Pigments:

0.5 to 5.0 parts by weight of pigment-quality carbon black

III. Binders 0.3 to 3 parts by weight of fatty acid methyl tauride, Na salt;

or 0.5 to 6.0 parts by weight of an aqueous polyethylene dispersion

IV. Carrier Liquid:

45 to 66 parts by weight of water;

0 to 5 parts by weight of isopropanol;

0 to 5 parts by weight of foam inhibitor;

0.05 to 0.1 parts by weight of thickener;

0.01 to 0.1 parts by weight of biocide.

* * * * *